(12) United States Patent
Lang et al.

(10) Patent No.: US 8,820,213 B2
(45) Date of Patent: Sep. 2, 2014

(54) WARNING DEVICE FOR A BEVERAGE MACHINE

(75) Inventors: Markus Lang, Wabern (CH); Peter Möri, Walperswil (CH); Renzo Moser, Gümmenen (CH)

(73) Assignee: Nestec S.A., Vevey (CH)

( * ) Notice: Subject to any disclaimer, the term of this patent is extended or adjusted under 35 U.S.C. 154(b) by 573 days.

(21) Appl. No.: 13/062,935

(22) PCT Filed: Oct. 22, 2009

(86) PCT No.: PCT/EP2009/063896
§ 371 (c)(1),
(2), (4) Date: Mar. 8, 2011

(87) PCT Pub. No.: WO2010/046442
PCT Pub. Date: Apr. 29, 2010

(65) Prior Publication Data
US 2011/0162531 A1 Jul. 7, 2011

(30) Foreign Application Priority Data
Oct. 23, 2008 (EP) ..................... 08167421

(51) Int. Cl.
*A47J 31/44* (2006.01)
(52) U.S. Cl.
USPC ............................ 99/285; 99/279
(58) Field of Classification Search
CPC ... A47J 31/3623; A47J 31/3676; A47J 31/52; A47J 31/4417; A47J 31/4407
USPC ....................... 99/285, 289 R, 295, 302 P, 290
See application file for complete search history.

(56) References Cited

U.S. PATENT DOCUMENTS

| 145,653 A | 10/1873 | Hitchcock |
| 1,256,206 A | 2/1918 | Gordley .................. 222/108 |

(Continued)

FOREIGN PATENT DOCUMENTS

| CH | 487 636 | 3/1970 |
| CH | 682 798 A5 | 11/1993 |

(Continued)

OTHER PUBLICATIONS

Non Final Office Action, U.S. Appl. No. 13/061,092 dated Feb. 15, 2013.

(Continued)

*Primary Examiner* — Jianying Atkisson
(74) *Attorney, Agent, or Firm* — K&L Gates LLP

(57) ABSTRACT

A machine for preparing a liquid food or beverage, including at least one outermost machine face selected from a front face, a top face and a lateral face; a component for emitting light and a control unit connected to the light emitting component. The light emitting component has states of light emission or non-emission, and an illuminatable outer face on the outermost machine face. The control unit is arranged to detect at least one condition of such machine involving a non immediate readiness of such machine to prepare a liquid food or beverage, and to communicate this condition to a user via the illuminatable outer face by changing the state of the light emitting component. The illuminatable outer face extends in at least one direction across a substantial part of the outermost machine face and is arranged to be substantially entirely illuminated when in this state of light emission.

17 Claims, 2 Drawing Sheets

(56) References Cited

U.S. PATENT DOCUMENTS

| | | | |
|---|---|---|---|
| 2,834,516 A | 5/1958 | Mosher | |
| 4,253,385 A | 3/1981 | Illy | 99/281 |
| 4,353,293 A | 10/1982 | Illy | |
| 4,377,049 A | 3/1983 | Simon et al. | 40/465 |
| 4,458,735 A | 7/1984 | Houman | 141/95 |
| 4,554,419 A | 11/1985 | King et al. | 200/5 |
| 4,687,119 A | 8/1987 | Juillet | 221/101 |
| 4,767,632 A | 8/1988 | Meier | 426/231 |
| 4,954,697 A | 9/1990 | Kokubun et al. | 235/381 |
| 5,161,455 A | 11/1992 | Anson et al. | 99/280 |
| 5,167,392 A | 12/1992 | Henricksen | 248/311.2 |
| 5,285,989 A | 2/1994 | Zilbert et al. | |
| 5,312,020 A | 5/1994 | Frei | 222/129.1 |
| 5,335,705 A | 8/1994 | Morishita et al. | 141/275 |
| 5,353,692 A | 10/1994 | Reese et al. | 99/289 |
| 5,372,061 A | 12/1994 | Albert et al. | 99/281 |
| 5,375,508 A | 12/1994 | Knepler et al. | 99/280 |
| 5,645,230 A | 7/1997 | Marogna et al. | 241/27 |
| 5,731,981 A | 3/1998 | Simard | 364/465 |
| 5,836,236 A | 11/1998 | Rolfes et al. | 99/290 |
| 5,927,553 A | 7/1999 | Ford | 222/129.4 |
| 5,959,869 A | 9/1999 | Miller et al. | 364/479.01 |
| 6,139,888 A | 10/2000 | Knepler | 426/231 |
| 6,182,555 B1 | 2/2001 | Scheer et al. | 99/290 |
| 6,238,721 B1 | 5/2001 | Knepler | 426/490 |
| 6,354,341 B1 | 3/2002 | Saveliev et al. | 141/94 |
| 6,465,035 B1 | 10/2002 | Knepler | 426/590 |
| 6,619,607 B2 | 9/2003 | Yamada | 248/311.2 |
| 6,696,676 B1 | 2/2004 | Graves et al. | |
| 6,759,072 B1 | 7/2004 | Gutwein et al. | 426/433 |
| 7,028,603 B1 | 4/2006 | Gremillion et al. | 99/290 |
| 7,270,050 B2 | 9/2007 | Glucksman et al. | 99/297 |
| 7,279,660 B2 | 10/2007 | Long et al. | 219/441 |
| 7,300,031 B2 | 11/2007 | Bertsch et al. | |
| 7,350,455 B2 | 4/2008 | Vetterli | 99/280 |
| 8,002,146 B2 | 8/2011 | Cahen et al. | |
| 2002/0131324 A1* | 9/2002 | Farrell | 366/147 |
| 2005/0016385 A1 | 1/2005 | Brinkemper et al. | 99/280 |
| 2005/0073823 A1* | 4/2005 | Engelmann et al. | 362/23 |
| 2006/0219102 A1* | 10/2006 | Geroult et al. | 99/495 |
| 2007/0157820 A1 | 7/2007 | Bunn | 99/275 |
| 2008/0148950 A1 | 6/2008 | Cahen | |
| 2008/0199580 A1 | 8/2008 | Accumanno et al. | 426/435 |
| 2009/0303695 A1* | 12/2009 | Buchstab et al. | 362/97.1 |
| 2011/0168026 A1 | 7/2011 | Cahen et al. | |
| 2011/0259202 A1 | 10/2011 | Cahen et al. | |

FOREIGN PATENT DOCUMENTS

| | | |
|---|---|---|
| CN | 2371917 Y | 4/2000 |
| CN | 2595026 | 12/2003 |
| CN | 2730271 Y | 10/2005 |
| CN | 1698505 A | 11/2005 |
| CN | 2783915 Y | 5/2006 |
| CN | 2889095 Y | 4/2007 |
| CN | 101232829 A | 7/2008 |
| DE | 2019445 | 11/1971 |
| DE | 44 29 353 A1 | 2/1996 |
| DE | 19647039 C2 | 7/1997 |
| DE | 202 00 419 U1 | 5/2002 |
| DE | 20 2005 002 814 U1 | 6/2005 |
| DE | 20 2004 020 983 | 7/2006 |
| DE | 20 2006 019 039 U1 | 3/2007 |
| DE | 10 2005 057 166 A1 | 5/2007 |
| EP | 549 887 A2 | 7/1993 |
| EP | 1208782 B1 | 5/2002 |
| EP | 1 448 084 B1 | 8/2004 |
| EP | 1 676 509 A1 | 7/2006 |
| EP | 1 707 088 B1 | 10/2006 |
| FR | 2 624 844 A1 | 6/1989 |
| FR | 2 858 713 A1 | 2/2005 |
| FR | 285716 A1 | 2/2005 |
| GB | 847662 | 9/1960 |
| GB | 2 240 206 | 7/1991 |
| GB | 2 397 510 | 7/2004 |
| JP | S5722724 A | 2/1982 |
| JP | 57-129527 A | 8/1982 |
| JP | 59-045043 A | 3/1984 |
| JP | 62-018027 U | 1/1987 |
| JP | 62-41620 A | 2/1987 |
| JP | 08140836 A2 | 6/1996 |
| JP | 08263734 A2 | 10/1996 |
| JP | 3041974 U | 7/1997 |
| JP | 200311542 A | 11/2000 |
| JP | 2002328772 A | 11/2002 |
| JP | 2003299573 A | 10/2003 |
| JP | 2004087250 A | 3/2004 |
| JP | 2004298418 A2 | 10/2004 |
| JP | 2005063962 A | 3/2005 |
| JP | 2006153422 A2 | 6/2006 |
| JP | 2007255783 A | 10/2007 |
| WO | WO 97/25634 A1 | 7/1997 |
| WO | WO 99/50172 A1 | 10/1999 |
| WO | WO 03/037151 A1 | 5/2003 |
| WO | WO 03/039309 A1 | 5/2003 |
| WO | WO 2004/023950 A1 | 3/2004 |
| WO | WO 2004/030435 A2 | 4/2004 |
| WO | WO 2004/030438 A2 | 4/2004 |
| WO | WO 2005/060801 A1 | 7/2005 |
| WO | WO 2006/005756 A1 | 1/2006 |
| WO | WO 2006/063645 A1 | 6/2006 |
| WO | WO 2006/082064 A1 | 8/2006 |
| WO | WO 2006/090183 A2 | 8/2006 |
| WO | WO 2006/104575 A1 | 10/2006 |
| WO | WO2006/124542 A2 | 11/2006 |
| WO | WO 2007/003062 A1 | 1/2007 |
| WO | WO 2007/003990 A2 | 1/2007 |
| WO | WO 2008/104751 A1 | 9/2008 |
| WO | WO 2008/138710 A1 | 11/2008 |
| WO | WO 2008/138820 A1 | 11/2008 |
| WO | WO 2009/043630 A1 | 4/2009 |
| WO | WO2010/037806 A1 | 4/2010 |
| WO | WO2010/046442 A1 | 4/2010 |

OTHER PUBLICATIONS

International Search Report, PCT/EP2009/063896, mailed Jan. 29, 2010.
International Search Report, PCT/EP2009/062741, mailed Feb. 8, 2010.
U.S. Appl. No. 13/061,092, filed Feb. 25, 2011.
International Search Report PCT/EP2009/053139 mailed Jul. 20, 2009.
Final Office Action U.S. Appl. No. 13/061,092 dated Aug. 7, 2013.
Advisory Action U.S. Appl. No. 13/177,123 dated Oct. 1, 2012.
Final Office Action U.S. Appl. No. 13/177,123 dated Jul. 16, 2013.
Final Office Action U.S. Appl. No. 13/177,123 dated Jan. 14, 2014.

* cited by examiner

WARNING DEVICE FOR A BEVERAGE MACHINE

This application is a 371 filing of International Patent Application PCT/EP2009/063896 filed Oct. 22, 2009.

FIELD OF THE INVENTION

The field of the invention pertains to liquid food or beverage preparation machines having a warning device for alerting a user.

BACKGROUND ART

Certain beverage or food preparation machines use capsules containing ingredients to be extracted or to be dissolved; for other machines, the ingredients are stored and dosed automatically in the machine or else are added at the time of preparation of the drink.

Most coffee machines possess filling means that include a pump for liquid, usually water, which pumps the liquid from a source of water that is cold or indeed heated through heating means, such as a heating resistor, a thermoblock or the like.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 10 2005 057 166, DE 20 2005 002 814, DE 20 2006 019 039, EP 1 448 084, EP 1 676 509, EP 1 707 088, EP 08 155 851.2, FR 2 624 844, FR 2 858 713, GB 2 397 510, GB 2 240 206, U.S. Pat. No. 4,253,385, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,645,230, U.S. Pat. No. 5,731,981, U.S. Pat. No. 5,836,236, U.S. Pat. No. 5,927,553, U.S. Pat. No. 5,959,869, U.S. Pat. No. 6,182,555, U.S. Pat. No. 6,354,341, U.S. Pat. No. 6,759,072, U.S. Pat. No. 7,028,603, U.S. Pat. No. 7,270,050, U.S. Pat. No. 7,279,660, U.S. Pat. No. 7,350,455, US 2007/0157820, WO 97/25634, WO 99/50172, WO 03/037151, WO 03/039309, WO 2004/030435, WO 2004/030438, WO 2006/063645, WO 2006/082064, WO 2006/090183, WO 2007/003062, WO 2007/003990, WO 2008/104751 and PCT/EP08/054,858.

In particular, in AT 410 377 a touch screen is inter alia used in a beverage machine to provide a feed-back of values measured in the machine by using sensors, such as the temperature of a beverage or a supply pressure including the use of a red-green signal. EP 1 448 084 and WO 03/037151 disclose a beverage machine with a display that inter alia indicates in a corner the statement "Warming up. Please wait!" when in its start-up mode. Likewise, U.S. Pat. No. 4,767,632 discloses a beverage machine with a display adapted to display an error message, such as "COFFEE MILL DEFECTIVE", "RESERVOIR EMPTY", "WATER TANK EMPTY" or "PUMP DEFECTIVE". U.S. Pat. No. 4,253,385 discloses a beverage machine having a lamp that is switched on while the machine's heater is being powered. DE 20 2005 002 814 discloses an interface of a washing machine or drier that has a display with a series of through-openings for allowing the passage of light from behind in order to form letters or numbers or text on the display. GB 2 240 206 discloses a washing machine or a cooker with a control panel having selector members and a display that is arranged to display graphic and/or numeric symbols of an operating program to be performed. FR 2 858 713 discloses a washing machine with a two figure seven-segment display and a turn-button associated with letters A to H and associated indicator light segments.

EP 1 707 088 discloses a full automatic coffee machine having a coffee grinder, a used ground coffee receptacle and a display or an indicator lamp to indicate that to the user when the receptacle is full and must be emptied. The disclosed display is generally square and has a height that makes up half of the height and a third of the width of an upper user-interface panel of the machine. The publication is silent as to the sign appearing on the display for indicating that the receptacle is full. However, the particular machine disclosed in the illustration of this publication has been commercialised by KRUPS under the designation "Espresseria Automatic EA8260". According to the French user-manual of this machine, when the receptacle needs to be emptied, this display displays an icon symbolising the removal of the receptacle and a drip tray together with the French text "Vider les 2 bacs", i.e. "Empty the 2 receptacles". As further disclosed in the user-manual, various further icons and associated text messages are displayed on the display in relation with different events.

DE 10 2005 057 166 discloses a fridge or deep freezer with a user-interface. The interface includes a horizontal series of aligned buttons, each button being associated with a LED indicator located above the button and indicating a state with the function associated with the corresponding button.

GB 2 397 510 discloses a coffee machine with a series of indicator LEDs, one of which may be used to indicate a low water level in the machine's tank. A similar interface arrangement is disclosed in U.S. Pat. No. 5,836,236 and in WO 2008/104751.

There is still a need to provide liquid food or beverage machines with a user-interface that has greater ergonomics and user-friendliness to facilitate acquisition by a user of information communicated to him/her by the machine.

SUMMARY OF THE INVENTION

It is a preferred object of the present invention to provide a liquid food or beverage preparation machine with a user-interface that has an improved communication capacity towards a user.

The invention thus relates to a machine for preparing a liquid food or beverage, in particular from a pre-portioned beverage or food ingredient such as an ingredient contained in a capsule or pod.

For instance, the machine is a coffee, tea or soup machine, in particular a machine for preparing a beverage or liquid food by passing hot or cold water or another liquid through a capsule or pod containing an ingredient of the beverage or liquid food to be prepared, such as ground coffee or tea or chocolate or cacao or milk powder.

The liquid food or beverage machine comprises at least one outermost machine face selected from a front face, a top face and a lateral face. The outermost machine front face typically bears a liquid food or beverage outlet optionally with a cup tray therebelow, in particular a drip tray. The machine front face may also bear a user interface for allowing the user to operate the machine.

This machine further includes a means for emitting light having at least one state of light emission and a state of light non emission and further having an illuminatable outer face on said at least one outermost machine face. The illuminatable outer face is arranged to be illuminated when in this state of light emission. The illuminatable outer face can be formed by a light conducting panel, rod or wire extending on said at least one outermost machine face.

A control unit is also provided in this machine and is connected to the light emitting means. The control unit is arranged to detect at least one condition of such machine and communicate said condition to a user via the illuminatable outer face by changing the state of the light means.

Typically, such a condition involves a non immediate readiness of such machine to prepare a liquid food or beverage. For example, such a condition relates to at least one of the state of filling of: a liquid receptacle, in particular a water reservoir; a storage arrangement for a spare food or beverage ingredient, in particular an ingredient contained in capsules or pods; and a receptacle for collecting a used food or beverage ingredient, in particular an ingredient contained in capsules or pods. Likewise, such a condition may include a state of pre-heating, scaling or cleaning of such machine.

In accordance with the invention, this illuminatable outer face extends in at least one direction across a substantial part of said at least one outermost machine face. Moreover, this illuminatable outer face is arranged to be substantially entirely illuminated when in this state of light emission indicative of such a condition (or absence of such a condition), the illuminatable outer face being in particular formed by a light conducting panel, rod or wire extending on said at least one outermost machine face.

The outer face that is substantially entirely illuminatable has at least one dimension that extends over a distance equal to an entire substantial part of a corresponding parallel outermost dimension of the at least one outermost machine face which is associated with the illuminatable outer face.

As opposed to prior art beverage machines that have an illuminatable interface screen, for instance as disclosed in the abovementioned EP 1 707 088, the interface element is illuminated (or switched off) over its entire user-visible face when a particular condition is detected, instead of merely displaying a corresponding text message and/or an icon selected from various different messages/icons for communicating various different information to the user. Such prior art messages and icons are not sufficiently distinctive to be understood from a distance. Instead, the user has to go to the machine and make an effort to read the interface in order to understand the message and/or icon.

For instance, such an outer machine face bearing the illuminatable face, has: a length and a width, or a width and a height, or a height and a length; the illuminatable machine face extending over a substantial part of at least one of these length, width and height.

The outer machine face may typically form a side of the machine's housing, for instance the front side, a lateral side or a top side of the machine. Alternatively, this outer machine face may form a section of such a side. For instance, the section is formed of an interface panel bearing user-selectors, e.g. buttons, and a display that arranged to be operated as an illuminatable face.

Typically, the illuminatable outer face is located on a side of the machine's housing and has a dimension that extends across a substantial part, e.g. at least about 40 to 50%, of the housing side, e.g. at least over about 40 to 50% of the length, width or height of the housing side.

Typically, this illuminatable outer face and this outermost machine face have a size ratio along at least one direction of at least 0.2, in particular a ratio in the range of 0.3 to 0.9 such as 0.35 to 0.8, optionally 0.4 to 0.65.

By providing such an outer face of substantial dimension, relative to the size of the machine, which is entirely illuminated upon the realisation of such a specific condition of a machine, the information as to this condition is immediately unavoidably and unambiguously apparent to a user, even when the user is at a distance of the machine.

Unlike the use of prior art visually poorly identifiable small LED's whose overall distinctiveness fades away among numerous apparent switches, lights and interface elements of such machines, or the use of specific text or symbol indications of such a condition, selected among a variety of messages available on a machine's versatile interface screen, the present invention facilitates the communication to a user. He or she will not have to scrutinize the machine and focus his or her attention on various parts thereof to find out about the existence of such a condition, let alone the type of condition. The existence of the condition and its nature will be immediately apparent to the user even from a distance, typically several meters away from the machine.

Hence, by communicating the condition in such a visually imposing or even intrusive manner, in relation with the other machine characteristics apparent to the user, by allowing the indication to stand out visually, the user will not find out of the existence of this condition only once he is facing and trying to operate the machine. On the contrary, the user will be made aware of this condition well in advance, at a significant distance of the machine. Hence, he will know well before physically reaching the machine that he will be confronted with such a condition and that he will have to deal with it.

Letting a user know, in advance, at a time when the user is not immediately expecting being served a cup of liquid food or beverage, for example while walking towards the machine, that he or she will also have to deal with a specific condition of the machine, will save the user frustration and stress. In particular, this will save the user the frustration and stress caused by the non execution of a request for a liquid food or beverage, or the frustration of being in the psychological process of requesting the serving of a beverage or liquid food and having to find out at the last moment that the machine is in no condition yet to fulfil such an expectations.

Hence, providing a machine with an indicator of the existence of a condition that visually stands out in such a manner that it is immediately apparent even for a non previously warned or alerted user, increases the cognitive ergonomics, the perception affecting the interaction between the user and the machine in a manner to lower the stress or frustration relating to the use of the machine and ease the interaction with the machine.

The liquid food or beverage machine may have a plurality of illuminatable outer faces, in particular a number of illuminatable outer faces in the range of 2 to 5 or 6, such as 3 to 4, the control unit being optionally arranged to communicate a plurality of conditions via this plurality of faces.

Likewise, the light means may have a plurality of states of light emission, in particular a plurality of colour states and/or states of continuity and intermittency of the light emission such as a flashing or blinking light emission, each state being associated with a condition detectable by the control unit. For example, when a machine's water receptacle wants refilling, the outer face may be illuminated with a light of a first colour, e.g. blue, when a waste ingredient receptacle is full the outer face may be illuminated with a second colour, e.g. red, when the spare ingredient storage is empty the outer face may be illuminated with a third colour, e.g. yellow, when the machine's heater is in a pre-heating process, the outer face may be illuminated with a light of a fourth colour, e.g. orange.

In one embodiment, the liquid food or beverage machine has a housing that bears at least one illuminatable outer face.

In another embodiment, the machine has a removable receptacle that, when in place in such machine, has an apparent surface that bears or forms at least one illuminatable outer face.

Such a receptacle may have an apparent front wall that forms at least one illuminatable outer face. The receptacle can have at least one upright lateral wall and/or a bottom wall with an apparent edge that forms at least one illuminatable outer face. The illuminatable outer face extends optionally over substantially an entire height or width of the receptacle.

The receptacle may be arranged for containing liquid such as water or for containing a beverage or food ingredient, in particular an ingredient that has been used and/or that is contained within a capsule or pod.

Typically, the liquid food or beverage machine has a printed circuit board (PCB), the light emission means comprising optionally one or more light sources such as LEDs electrically connected, in particular rigidly connected, to the printed circuit board. Providing a rigid connection instead of a flexible connection, e.g. via flexible electric cables, facilitates the assembly and the manufacturing of the light emission means, and thus the production costs of the machine.

The light means may include at least one light guide, e.g. made of a transparent plastic material, arranged to guide emitted light to at least one illuminatable outer face. For instance, such a light guide forms a wall of a machine's housing or of a machine's receptacle, such a wall being in particular at an angle to said illuminatable outer face, such as perpendicular thereto.

The control unit may be connected to at least one sensor for detecting a specific condition of the machine. For instance, the sensor is selected from a capacitive sensor, magnetic sensor, optical sensor, temperature sensor and weight sensor and/or being optionally rigidly connected to a printed circuit board that is part of said control unit.

In an embodiment, at least one sensor comprises an optical sensor having a light emitter and a light receiver associated with a receptacle and arranged to detect in the receptacle a level of content or a presence of content at a predetermined level in the reservoir by diversion of at least one light ray emitted by said light emitter and diverted by said content onto or away from said light receiver or on a special location thereon, one or both of said emitter and receiver being optionally rigidly connected to a printed circuit board such as a board that is part of the machine's control unit.

Whereas the optical sensor may operate with any wave length appropriate to interact with the receptacle and intended content thereof, in particular in the infrared light spectrum, the light emitting means with the illuminatable outer face normally provide a light emission in a range visible for a user.

BRIEF DESCRIPTION OF THE DRAWINGS

The invention will now be described with reference to the schematic drawings, wherein.

DETAILED DESCRIPTION

Figure 1:
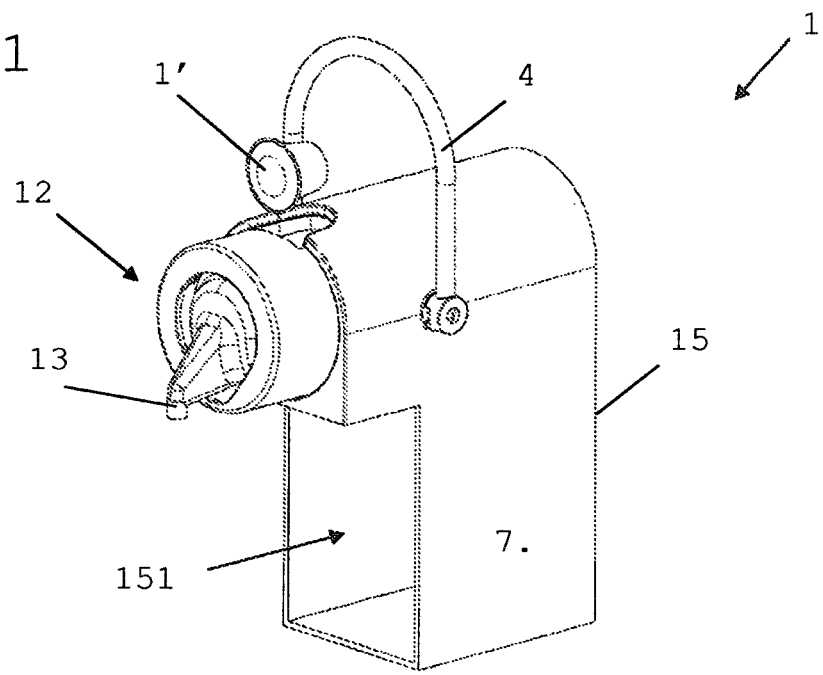
FIG. 1 shows part of a liquid food or beverage preparation machine according to the invention.
Figure 3:
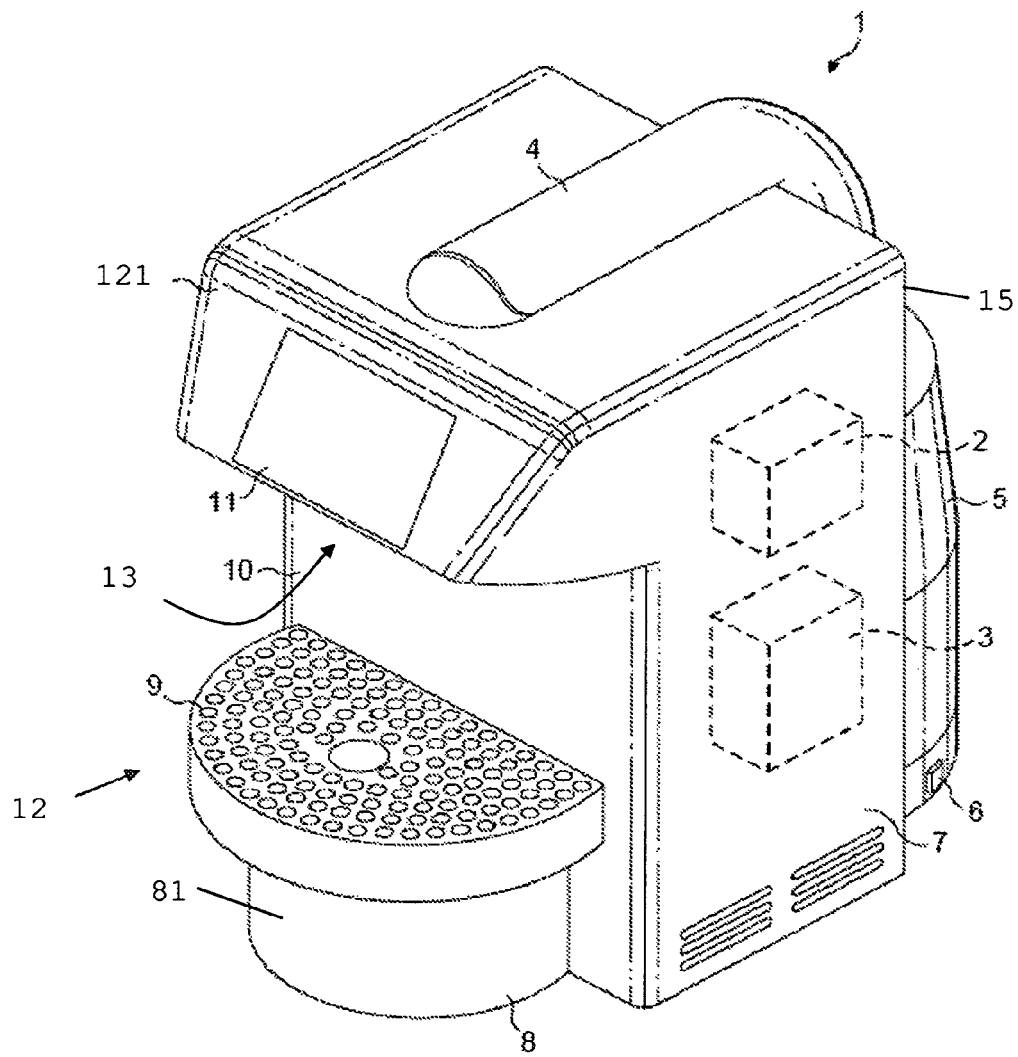
FIG. 3 illustrates another liquid food or beverage preparation machine according to the invention.

FIGS. 1 and 3, in which the same numeric references designate generally the same elements, illustrate two different beverage or liquid food machines 1, in particular coffee machines. Machines 1 are arranged to dispense coffee from pre-proportioned ground coffee batches, for instance supplied within packages, typically capsules 1' or pods, into a brewing unit of machines 1 for extraction by passing heated water therethrough, as known in the art and for instance disclosed in EP 1 646 305.

Machine 1 has a housing 15 with various faces 7,12. As schematically illustrated in FIG. 3, housing 15 contains a heater module 2 and a pump module 3 for pumping and heating water from a tank 5 connected to the machine's housing. Machine 1 further has a handle 4 pivotable about a rear part of the machine and arranged for opening and closing a brewing unit (not shown) located thereunder, and covering and uncovering access to the brewing unit. The heated water is guided via pump 3 and heater 2 to the brewing chamber containing an ingredient of the beverage, e.g. ground coffee such as pre-portioned ground coffee in a capsule 1' or pod, and thus prepared beverage is dispensed via an outlet 13 (shown in FIG. 1) to a cup positioned underneath.

Figure 2:
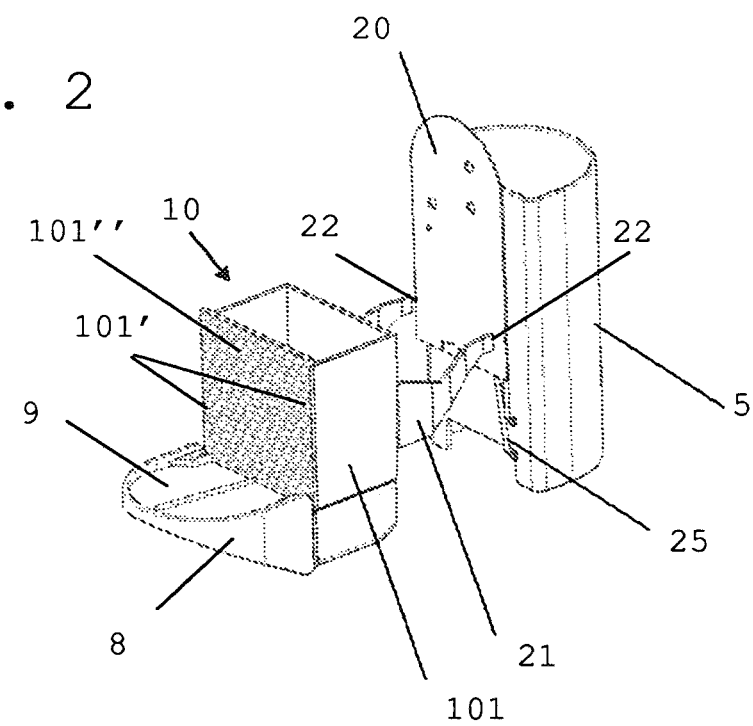
FIG. 2 illustrates a used ingredient receptacle and a water receptacle that can be assembled to the machine shown in FIG. 1.

Housing 15 of machine 1 shown in FIG. 1 has a front opening 151 leading into a cavity within the housing for receiving the removable drip tray assembly 8,9,10, the light guide 21 and a control unit that includes a PCB 20, as shown in FIG. 2. Light guide 21 and PCB 20 are fixed within the cavity of housing 15. Water reservoir 5 of FIG. 2 can be mounted against a rear face of machine 1.

The control unit is arranged to control various electric functions of machine 1, such as heater module 2 and pump module 3.

As illustrated in FIG. 2, the drip tray assembly has a drip member 9 supported on a tray 8 forming a receptacle for collecting liquid evacuated via the drip member 9. Drip member 9 also serves as a support for a cup during beverage or liquid food dispensing via outlet 13. The drip tray assembly further has a capsule reservoir 10 located underneath the machine's brewing unit (not shown) for collecting used capsules 1' evacuated from the brewing unit (not shown) upon brewing.

Drip tray assembly 8,9,10, when in place in the machine's housing 15, is spaced apart from PCB 20 by light guides 21. Between PCB 20 and drip tray assembly 8,9,10 extends within housing 15, part of the liquid circulation system (not shown) of beverage machine 1, in particular a water pump that is connectable to a bottom part of water reservoir 5 and to a heater and brewing unit (not shown) of liquid food or beverage preparation machine 1.

PCB 20 bears a pair of LEDs 22 at the corresponding extremities of light guides 21. Light guides 21 are arranged to guide light generated by LEDs 22 to a rear edge of lateral sidewalls 101 of receptacle 10. As PCB 20 is narrower than the spacing between lateral sidewalls 101, light guides 22 are appropriately arched like a generally flattened S shape, so that each guide 21 has its extremities aligned with the direction of the incoming light, from LED 22, and the outgoing light, into the rear edge of wall 101, as shown in FIG. 2.

Walls 101 are arranged to guide light from their rear edge to their front edge 101' which are thus illuminated by the light emitted from LEDs 22 and guided via light guide 21 and walls 101.

In order to spread light over substantially the entire height of front edge 101', light guide 21 has a generally inverted funnel shape.

In a variation, with an appropriate geometry of the light guides and refraction indicia, it is also possible to illuminate substantially the entire front wall 101".

Light guides 22 and walls 101 are preferably made of suitable material, in particular very clear plastic material. For example, receptacle 10, in particular walls 101, is made of SMMA, which is also dishwasher fit. Light guides 21 may be made of polycarbonate plastic material.

Furthermore, water reservoir 5 is fitted with a water level sensor 25, in particular an optical sensor suitable to detect a low level of water in reservoir 5. Level sensor 25 is connected, in particular rigidly connected, to PCB 20.

When a low level of water is detected in reservoir 5 via detector 25, which corresponds to a low water condition of machine 1, the control unit activates LEDs 22 which emit light into the adjacent extremity of light guides 21. The light is then guided along guides 21 into the rear edge of walls 101. Therefrom, the emitted light spreads along walls 101 to their front edges 101' which are substantially homogeneously illuminated over their entire height.

As edges 101' have a height that corresponds to more than 90% of the height of face 101' and to approximately a third of the overall height of machine 1, in particular of the machine's overall front face 12, a user will immediately notice the change in the general appearance of the machine and know from a distance that a special condition exists, i.e. a low water condition, and that he or she will have to refill water reservoir 5 before being able to request a beverage or liquid food preparation. Hence, the user will not be disappointed or frustrated when he or she reaches the machine that is in no condition to immediately dispense any beverage or liquid food, as the user will have been warned well in advance and thus will not be confronted to such a frustrating surprise.

Turning again to FIG. 3, machine 1 has an ordinary touch screen user-interface 11 for controlling the usual functions of machine 1, e.g. setting the beverage dispensing parameters, such as quantities or preparation temperatures and two illuminatable faces 121,81. For this purpose, user-interface 11 is connected to a control unit comprising a PCB (not shown).

The control unit typically comprises a PCB, a micro-controller, a memory chip, and electric connectors to the different electric components of machine 1, such as heater module 2, pump module 3, sensors 25, interface 11, LEDs, main switch 6 and other switches, etc. . . . . The control unit is configured for carrying out one or more operational processes of machine 1, in particular the beverage preparation process as well as for example automatic shut down processes, self-cleaning processes, interface communication processes etc. . . . .

First illuminatable face 121 is located at a top part of housing 15 of machine 1 on the machine's front face 12 and extends over substantially the entire width of machine 1. Face 121 is illuminated via LEDs and a light guide (not shown) when the water level in receptacle 5 is low, in a similar way as described above in relation with FIGS. 1 and 2.

Second illuminatable face 81 is also located on the machine's front face 12 and is formed by an arched bottom wall of drip tray arrangement 8,9,10 and extends over 70 or 80% of the overall width of the machine 1, in particular of the machine's front face 12. Face 81 is illuminated via further LEDs and light guides (not shown) when receptacle 10 is filled with used capsules collected upon brewing in the machine's brewing unit (not shown).

As illuminatable faces 81 and 121 have a width that corresponds to approximately 80 and 100% of the overall width of machine 1, in particular of the width of the machine's overall front face, a user will immediately notice the change in the general appearance of the machine and know from a distance that a special condition exists, i.e. a low water condition or a condition as to a full waste ingredient receptacle 10, respectively. Hence, the user will be warned that he or her will have to refill water reservoir 5 or empty receptacle 10, as the case may be, before being able to request a beverage or liquid food preparation, without having to search for a reason why machine 1 refuses to prepare a liquid food or beverage. Hence, the user will not be disappointed or frustrated when reaching the machine that is in no condition to immediately dispense any beverage or liquid food as the user will have been warned well in advance.

What is claimed is:

1. A machine for preparing a liquid food or beverage, comprising:
    a housing that contains a brewing chamber that is configured and arranged to receive a package containing a pre-portioned beverage or food ingredient for preparing the liquid food or beverage after receiving heated water;
    a heater module for heating water and a pump module for pumping the heated water to the package for combining with the ingredient to form the liquid food or beverage, these modules also being present in the housing;
    at least one outermost machine face selected from a front face, a top face and a lateral face and associated with the housing in a user viewable location thereon;
    means for emitting light having at least one state of light emission and a state of light non-emission;
    a removable receptacle removably associated with and received in the housing, operatively associated with the light emitting means, and having an apparent surface that bears or forms an illuminatable outer face on one of the at least one outermost machine face, with the illuminatable outer face being arranged to be illuminated when in the state of light emission; and
    a control unit connected to the light emitting means, the control unit being arranged to detect at least one condition of such machine involving a non-immediate readiness of such machine to prepare a liquid food or beverage, and to communicate the condition to a user via the illuminatable outer face by changing the state of the light emitting means;
    wherein the at least one illuminatable outer face of the receptacle is in illumination association with the light emitting means by or through light guides, extends in at least one direction across part of one of the at least one outermost machine face and is arranged to be illuminated when in the state of light emission, with the illuminatable outer face comprising a light conducting panel, rod or wire extending upon the at least one outermost machine face to provide the apparent surface that is illuminated.

2. The machine of claim 1, which includes a printed circuit board in association with or as part of the control unit, wherein the light emitting means include LEDs that are physically and electrically connected to the printed circuit board, and wherein at least one light guide forms a wall of the receptacle, with the wall being provided at an angle that is perpendicular to the illuminatable outer face, and the receptacle is configured, arranged and positioned to receive a liquid or a beverage or food ingredient from the machine and to contain the liquid or ingredient therein.

3. The machine of claim 2, wherein the beverage or liquid food is prepared from the pre-portioned beverage or food ingredient in a capsule or pod package, wherein the receptacle is arranged for receiving and containing the beverage or liquid food; and the at least one condition relates to at least one of the state of filling of: the liquid receptacle; the storage arrangement for capsules containing the food or beverage ingredient; or a chamber for collecting used capsules.

4. The machine of claim 1, wherein the control unit is connected to at least one sensor for detecting the condition, with the at least one sensor comprising an optical sensor having a light emitter and a light receiver associated with a receptacle which is arranged to detect in the receptacle a level of content or a presence of content at a predetermined level in the reservoir by diversion of at least one light ray emitted by the light emitter and diverted by the content onto or away from the light receiver or on a special location thereon, with one or both of the emitter and receiver being rigidly connected to the printed circuit board that is part of the control unit.

5. The machine of claim 1, wherein the illuminatable outer face and the outermost machine face have a size ratio along the at least one direction of 0.2 to 0.9.

6. The machine of claim 1, which has a plurality of illuminatable outer faces in the range of 2, 3, 4, 5, or 6 with the control unit being optionally arranged to communicate a plurality of the conditions.

7. The machine of claim 1, wherein the light emitting means has a plurality of states of light emission, including a plurality of color states or states of continuity and intermittency of light emission including flashing or blinking, each state being associated with a condition detectable by the control unit.

8. The machine of claim 1, which has a housing that bears at least one illuminatable outer face.

9. The machine of claim 1, wherein the receptacle has either at least one upright lateral wall or a bottom wall with an apparent edge that forms at least one illuminatable outer face, the illuminatable outer face extending over the entire height or width of the receptacle.

10. The machine of claim 1, wherein the receptacle is arranged for containing a liquid or a beverage or food ingredient that is prepared by the machine, wherein the receptacle is supported by a removable drip tray assembly that is removably associated with the housing of the machine.

11. The machine of claim 1, which includes a printed circuit board in association with or as part of the control unit, wherein the light emitting means comprises one or more light sources electrically connected to the printed circuit board.

12. The machine of claim 1, further comprising at least one light guide arranged to guide emitted light from the light emitting means to the at least one illuminatable outer face, with the at least one light guide forming a wall of a housing or the receptacle for the machine, with the wall being provided at an angle to the illuminatable outer face.

13. A machine for preparing a liquid food or beverage, comprising:
   a housing that contains a brewing chamber that is configured and arranged to receive a package containing a pre-portioned beverage or food ingredient for preparing the liquid food or beverage after receiving heated water;
   a heater module for heating water and a pump module for pumping the heated water to the package for combining with the ingredient to form the liquid food or beverage, these modules also being present in the housing;
   at least one outermost machine face selected from a front face, a top face and a lateral face and associated with the housing in a user viewable location thereon;
   means for emitting light having at least one state of light emission and a state of light non-emission;
   a removable receptacle removably associated with and received in the housing, operatively associated with the light emitting means and having an apparent surface that bears or forms an illuminatable outer face on one of the at least one outermost machine face, with the illuminatable outer face being arranged to be illuminated when in the state of light emission; and
   a control unit connected to the light emitting means, the control unit being arranged to detect at least one condition of such machine involving a non-immediate readiness of such machine to prepare a liquid food or beverage, and to communicate the condition to a user via the illuminatable outer face by changing the state of the light emitting means;
   wherein the illuminatable outer face is in illumination association with the light emitting means by or through light guides, extends in at least one direction across part of one of the at least one outermost machine face and is arranged to be illuminated when in the state of light emission, with the illuminatable outer face comprising a light conducting panel, rod or wire extending upon the at least one outermost machine face to provide the apparent surface that is illuminated, and
   wherein the at least one condition relates to at least one of the state of filling of: the receptacle; a storage arrangement for a spare food or beverage ingredient; or a chamber for collecting a used food or beverage ingredient or used package.

14. The machine of claim 1, wherein the at least one condition relates to a state of pre-heating, scaling or cleaning of such machine.

15. The machine of claim 1, wherein the control unit is connected to at least one sensor for detecting the condition, with the sensor being optionally selected from a capacitive sensor, magnetic sensor, optical sensor, temperature sensor and weight sensor and being optionally rigidly connected to a printed circuit board that may be part of the control unit.

16. The machine of claim 15, wherein the at least one sensor comprises an optical sensor having a light emitter and a light receiver associated with a receptacle which is arranged to detect in the receptacle a level of content or a presence of content at a predetermined level in the reservoir by diversion of at least one light ray emitted by the light emitter and diverted by the content onto or away from the light receiver or on a special location thereon, with one or both of the emitter and receiver being optionally rigidly connected to a printed circuit board that is part of the control unit.

17. The machine of claim 1, wherein the beverage or liquid food is prepared from a pre-portioned beverage or food ingredient; the illuminatable outer face and the outermost machine face have a size ratio along the at least one direction of 0.35 to 0.8 and the light emitting means comprises light emitting diodes (LEDs), optionally in combination with a light guide arranged to guide emitted light from the LEDs to the at least one illuminatable outer face.

\* \* \* \* \*